United States Patent
Ichikawa

(10) Patent No.: US 6,950,727 B2
(45) Date of Patent: Sep. 27, 2005

(54) VIBRATION CONTROLLER FOR ACTIVE VIBRATION INSULATORS AND METHOD FOR CONTROLLING VIBRATIONS OF THE SAME

(75) Inventor: Hiroyuki Ichikawa, Kani (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/988,663

(22) Filed: Nov. 16, 2004

(65) Prior Publication Data

US 2005/0113979 A1 May 26, 2005

(30) Foreign Application Priority Data

Nov. 20, 2003 (JP) ....................... 2003-390766

(51) Int. Cl.⁷ ............................................. G06F 19/00
(52) U.S. Cl. .................. 700/280; 700/275; 318/71.12; 73/570; 702/191
(58) Field of Search .......................... 700/60, 66, 286, 700/280, 191, 279, 188; 318/71.17, 71.4, 71.7; 702/191, 56, 76; 73/570, 166, 658, 600

(56) References Cited

U.S. PATENT DOCUMENTS 5,792,948 A * 8/1998 Aoki et al. .................. 73/116
6,018,689 A * 1/2000 Kumura et al. ............. 700/280
2003/0040818 A1 * 2/2003 Pletner et al. ................ 700/60

FOREIGN PATENT DOCUMENTS

JP 2001-140974 5/2001
JP 2003-47260 2/2003

* cited by examiner

Primary Examiner—Kidest Bahta
(74) Attorney, Agent, or Firm—Oblon, Spivak, McClelland, Maier & Neustadt, P.C.

(57) ABSTRACT

A vibration controller includes an input signal generator for generating input signals based on cyclically pulsating signals emitted from a vibration generating source, an actuating waveform detector for detecting actuating waveforms of an electromagnetic actuator of active vibration insulators, a waveform analyzer for determining higher harmonic component datum information by carrying out a waveform analysis, a higher harmonic component signal generator for generating higher harmonic component signals of the actuating waveforms based on the higher harmonic component datum information, a higher harmonic component signal remover for removing the higher harmonic component signals from the input signals and outputting the resulting processed input signals, and an actuator for receiving the processed input signals, generating output signals based on the processed input signals and actuating the electromagnetic actuator in accordance with the output signals. Thus, it is possible to inhibit the vibration generating source from vibrating effectively and less expensively.

10 Claims, 6 Drawing Sheets

VIBRATION CONTROLLER FOR ACTIVE VIBRATION INSULATORS AND METHOD FOR CONTROLLING VIBRATIONS OF THE SAME

BACKGROUND OF THE INVENTION

1. Field of the Invention

The present invention relates to a vibration controller and a vibration control method for active vibration insulators, vibration controller and method which can actively inhibit vehicles from vibrating.

2. Description of the Related Art

As disclosed in Japanese Unexamined Patent Publication (KOKAI) No. 2001-140,974, an adaptive control method, for example, an adaptive control method which uses a retarded harmonic synthesizer minimum mean squared filter 50 (hereinafter referred to as "DXHS LMS" filter), has been applied to controlling the vibrations of an engine mount, an automotive active vibration insulator. Specifically, as illustrated in FIG. 7, a sensor retrieves crankshaft rotary pulses and ignition pulsating signals from a vibration generating source 51, such as an automotive engine making a signal source, and corrugates them into a pulsating signal s synchronizing with a control objective signal. Moreover, vibrations generated by the vibration generating source 51 are transmitted into a vehicle passenger room as outer forces by way of a transmission system 52 (G'). A frequency judge 53 converts the pulsating signal s into a sine wave synchronizing with the control objective signal, and turns it into a control objective signal x. An adaptive filter 54 (W) compensates the control objective signal x for amplitude and phase with filter coefficients which are a function of amplitude compensation coefficients and phase compensation coefficients, and outputs it as a cyclic signal y which comprises a sine wave with the compensated amplitude and phase. The cyclic signal y is input into a control objective system 55 (or transmission function G), and is output as a processed signal z by way of the control objective system 55.

After the outer force d, the vibrations of engines, which is transmitted by way of the transmission system 52 (G'), is added to the processed signal z, the sensor detects the processed signal z with the outer force d added as an observed value. Note that the target detection value of sensors is zero in vibration control. Accordingly, the difference between the value by detected the sensor and the target value is an error signal e. A digital filter 57 updates the adaptive filter 54 (W) successively using the error signal e and a value estimated by a control objective system 56 (estimated transmission function $\hat{G}$). The estimated transmission function $\hat{G}$ is produced by impulse response measurements and frequency sweeping vibration tests, and is cited when updating the adaptive filter 54.

To summarize, the cyclic signal y is prepared in the following manner. After determining an adaptive filter for every arbitrary rotation number (or frequency). The control objective signal x is compensated for amplitude and phase, and is synthesized into a sine wave signal to result in the cyclic signal y. Then, the resulting cyclic signal y is input into the control objective system 55 (or transmission function G), and is output as the processed signal z. Eventually, the processed signal z controls the outer force d, the vibrations of engines, which is transmitted by way of the transmission system 52 (G'). However, when controlling the vibrations of vibration insulators by adaptive control methods, there arises a problem that the vibration control is so complicated that the cost for the vibration control has gone up.

On the other hand, a simplified vibration control method has been available in which an adaptive control is carried out in compliance with vehicle controllers, though it uses the DXHS LMS filter 50 which operates in the same manner as the above-described adaptive control method. For example, as illustrated in FIG. 7, an optimum filter coefficient is determined for every arbitrary rotation number (or frequency). The resulting optimum filter coefficient data are stored as a data table. The stored data table is retrieved as a ROM 58. Specifically, as illustrated in FIG. 8, a sensor retrieves crankshaft rotary pulses from a vibration generating source 51, such as an automotive engine making a signal source. The frequency judge 53 judges whether retrieved signals are a control objective frequency ω, and selects a control objective signal x of the control objective frequency ω and output the selected control objective signal x. An amplitude/phase compensator 59 compensates the control objective signal x for amplitude and phase with the filter coefficients stored in the ROM 58 as the data table, synthesizes it into a sine wave signal, and outputs a cyclic signal y. A control objective system 55 (or transmission function G) processes the cyclic signal y to output a processed signal z. The resulting processed signal z controls the outer force d, the vibrations of engines, which is transmitted by way of a transmission system 52 (or transmission function G') As a result, the simplified vibration control method can make the cost for the vibration control less expensive, because it is possible not only to obviate the sensor for detecting vibrations but also to simplify the construction of the controller compared with vibration insulators controlled by the above-described adaptive control method.

In actuality, however, the cyclic signal y is output in the following manner. As illustrated in FIG. 9, a controller unit 31 selects an optimum filter coefficient from a data table ROM 58 depending on input pulsating signals x emitted from engines. Then, the controller unit 31 generates corresponding waveform data out of a waveform storage 32 which stores a waveform table on waveforms, that is, sine wave signals in which distortions resulting from higher order harmonic components are included in advance. Thus, the controller unit 31 outputs the input pulsating signal x as the cyclic signal y. Then, a pulse-width modulated signal generator 40 modulates the cyclic signal y by a pulse-width modulation which changes the amplitude of cyclic waveforms into the pulse width. Thus, the pulse-width modulated signal modulator 40 outputs the cyclic signal y as a pulse-width modulated pulsating signal (hereinafter referred to as PWM signal) p. Moreover, an actuator circuit 42 comprising a so-call H-bridge circuit 43 turns the PWM pulsating signal p into a cyclic-waveform actuating current depending on the signal inversion. The resultant actuating current actuates an electromagnetic actuator 22 of an engine mount which is connected with the output side of the actuator circuit 42. Specifically, an alternate current actuation is carried out in an actuator circuit using direct currents.

As described above, the waveform table stored in the waveform storage 32 does not comprise data on sine waves, but comprises data produced by subtracting higher order harmonic components from sine waves. Thus, waveform storage 32 stores the table on waveforms in which the distortions are included in advance. Accordingly, even when cross-over distortions resulting from pulse-width modulations or distortions resulting from the time constant of electromagnetic actuators are added to the cyclic signal including the aforementioned distortions, these distortions cancel the distortions included in the cyclic signal in advance to remove them. As a result, it is possible to actuate the electromagnetic actuator 22 with an actuating current which is substantially free form distortions. Consequently, the resulting appropriate vibrating forces can inhibit the vibration generating source from vibrating effectively.

Incidentally, when generating the cyclic signal y based on data tables comprising data on sine waves free from distortions, it is possible to generate the cyclic signal y which uses one such a data table comprising data on sine waves free from distortions, even if the frequency, amplitude and phase of the cyclic signal y vary.

However, in the above-described vibration control methods, it is required to use data tables comprising data on waveforms including distortions, instead of data tables comprising data on sine waves free from distortions. It has required a lot of labor to prepare such waveform tables including distortions. Moreover, when generating the cyclic signal y based on such a waveform table including distortions, it has been necessary to use waveform data for every frequency, amplitude and phase of the cyclic signal y. That is, waveform tables should be prepared for each of a large number of the frequencies, or for every type of different vehicles.

Thus, the above-described vibration control methods have required an extremely large amount of labor, because a large number of waveform tables should be prepared, in addition the labor requirement for preparing each of the waveform tables. Accordingly, the above-described vibration control methods have been associated with a problem that the cost for the vibration control has become expensive.

SUMMARY OF THE INVENTION

The present invention has been developed in order to solve the aforementioned problems. It is therefore an object of the present invention to provide a vibration controller for active vibration insulators, and a vibration control method for the same, vibration controller and vibration control method which can remove higher harmonic components included in output signals for actuating electromagnetic actuators securely as well as readily and less expensively with waveform tables free from distortions, so-called sine wave tables.

In order to achieve the aforementioned object, a vibration controller for active vibration insulators according to a first aspect of the present invention comprises:

an input signal generator for generating input signals comprising a control frequency and phase, the control frequency and phase based on cyclically pulsating signals emitted from a vibration generating source;

an actuating waveform detector for detecting actuating waveforms of an electromagnetic actuator of active vibration insulators;

waveform analyzing means for determining higher harmonic component datum information on the actuating waveforms by carrying out a waveform analysis on the actuating waveforms;

a higher harmonic component signal generator for generating higher harmonic component signals of the actuating waveforms based on the higher harmonic component datum information;

a higher harmonic component signal remover for removing the higher harmonic component signals from the input signals and outputting the resulting processed input signals; and an actuator for receiving the processed input signals, generating output signals based on the processed input signals and actuating the electromagnetic actuator in accordance with the output signals;

whereby inhibiting the vibration generating source from vibrating by means of vibrating forces exerted by the electromagnetic actuator.

Note that the higher harmonic component signals designate higher harmonic component signals corresponding to the input signals. Moreover, the higher harmonic component datum information specifies not only datum information determined by the waveform analyzing means but also datum information for generating the higher harmonic component signals.

Specifically, the vibration controller according to the first aspect of the present invention can determine the higher harmonic component datum information on the actuating waveforms of the electromagnetic actuator of active vibration insulators by a waveform analysis, such as a fast Fourier transformation method, for example. The higher harmonic component signal generator generates the higher harmonic component signals based on the higher harmonic component datum information. The higher harmonic component signal remover removes the thus generated higher harmonic component signals from the input signals, and outputs the resulting processed signals to the actuator. The actuator generates output signals based on the processed signals. That is, it is possible to securely remove the higher harmonic component signals included in the output signals for actuating the electromagnetic actuator. Moreover, when the output signals with the higher harmonic components removed actuate the electromagnetic actuator of active vibration insulators, it is possible to appropriately inhibit the vibration generating source from vibrating by means of the vibrating forces exerted by the electromagnetic actuator. In other words, the electromagnetic actuator can produce an appropriate vibrating forces, because it is possible to securely remove cross-over distortions, generating in the processes of forming the output signals, as well as distortions, resulting from the time constant of the final electromagnetic actuator, from the output signals.

Moreover, the input signal generator can generate the input signals free from the higher harmonic component signals, because the higher harmonic component signal generator generates the higher harmonic component signals. Therefore, the input signal generator can generate input signals with sine wave tables free from distortions. Thus, the vibration controller according to the first aspect of the present invention can generate the input signals with ease, and can make the cost for the vibration control less expensive, because it can generate the input signals with sine wave tables free from distortions. In addition, the vibration controller according to the first aspect of the present invention can furthermore reduce the cost for the vibration control, because it determines the higher harmonic component datum information by a simple waveform analysis method to remove the higher harmonic component signals, calculated based on the higher harmonic component datum information, from the input signals.

Note that it is possible to adapt the vibration controller according to the first aspect of the present invention to a vibration control method. For example, a method according to the first aspect of the present invention for controlling vibrations of active vibration insulator comprises the steps of:

generating input signals comprising a control frequency and phase, the control frequency and phase based on cyclically pulsating signals emitted from a vibration generating source;

detecting actuating waveforms of an electromagnetic actuator of active vibration insulators;

determining higher harmonic component datum information on the actuating waveforms by carrying out a waveform analysis on the actuating waveforms;

generating higher harmonic component signals of the actuating waveforms based on the higher harmonic component datum information;

removing the higher harmonic component signals from the input signals, and outputting the resulting processed input signals; and receiving the processed input signals, and generating output signals for actuating the electromagnetic actuator based on the processed input signals;

thereby inhibiting the vibration generating source from vibrating by means of vibrating forces exerted by the electromagnetic actuator actuated in accordance with the output signals.

The vibration control method according to the first aspect of the present invention operates and effects advantages in the same manner as the above-described vibration controller according to the first aspect of the present invention.

Moreover, in order achieve the aforementioned object, a vibration controller for active vibration insulators according to a second aspect of the present invention comprises:

an input signal generator for generating input signals comprising a control frequency and phase, the control frequency and phase based on cyclically pulsating signals emitted from a vibration generating source;

higher harmonic component datum information storing means for storing higher harmonic component datum information on actuating waveforms, the actuating waveforms determined in advance by analyzing actuating waveforms of an electromagnetic actuator of active vibration insulators on a plurality of the control frequencies with waveform analyzing means;

a higher harmonic component signal generator for generating higher harmonic component signals of the actuating waveforms based on the control frequency, which is based on the cyclically pulsating signals, and higher harmonic component datum information, which is stored in the higher harmonic component datum information storing means;

a higher harmonic component signal remover for removing the higher harmonic component signals from the input signals and outputting the resulting processed signals; and an actuator for receiving the processed input signals, generating output signals based on the processed input signals and actuating the electromagnetic actuator in accordance with the output signals;

whereby inhibiting the vibration generating source from vibrating by means of vibrating forces exerted by the electromagnetic actuator.

Specifically, the vibration controller according to the second aspect of the present invention not only determines higher harmonic component datum information on actuating waveforms in advance by analyzing actuating waveforms of the electromagnetic actuator of active vibration insulators on a plurality of the control frequencies with waveform analyzing means, but also stores the resulting higher harmonic component datum information in the higher harmonic component datum information storing means. Then, the vibration controller selects a series of higher harmonic component datum information, which corresponds to the control frequency calculated based on the cyclic pulsating signals emitted from the vibration generating source, from the stored higher harmonic component datum information determined for each of a plurality of the control frequencies, and generates the higher harmonic control signals based on the selected higher harmonic component datum information. The vibration controller can output optimum output signals, which are processed by removing the higher harmonic component signals from the input signals, to the actuator, because the higher harmonic component signal remover removes the higher harmonic component signals from the input signals. Thus, when the output signals with the higher harmonic component signals removed actuate the electromagnetic actuator of active vibration insulators, it is possible to appropriately inhibit the vibration generating source from vibrating by means of the vibrating forces exerted by the electromagnetic actuator. In other words, the electromagnetic actuator can produce an appropriate vibrating forces, because it is possible to securely remove cross-over distortions, generating in the processes of forming the output signals, as well as distortions, resulting from the time constant of the final electromagnetic actuator, from the output signals.

Moreover, the vibration controller according to the second aspect of the present invention can generate the higher harmonic component signals quickly, because it stores the higher harmonic component datum information in the higher harmonic component datum information storing means in advance. Note that, in the vibration controller, the higher harmonic component datum information is determined by a simple waveform analysis method, such as a fast Fourier transformation method, for example, and the higher harmonic component signals calculated based on the resulting higher harmonic component datum information are removed from the input signals. Hence, the vibration controller can make the cost for the vibration control less expensive.

In addition, the input signal generator can generate the input signals free from the higher harmonic component signals, because the higher harmonic component signal generator generates the higher harmonic component signals. Therefore, the input signal generator can generate input signals with sine wave tables free from distortions. Thus, the vibration controller according to the second aspect of the present invention can generate the input signals with ease, and can make the cost for the vibration control much less expensive, because it can generate the input signals with sine wave tables free from distortions.

Note that it is possible to adapt the vibration controller according to the second aspect of the present invention to a vibration control method. For example, a method according to the second aspect of the present invention for controlling vibrations of active vibration insulator comprises the steps of:

generating input signals comprising a control frequency and phase, the control frequency and phase based on cyclically pulsating signals emitted from a vibration generating source;

preparing higher harmonic component datum information on actuating waveforms in advance, the actuating waveforms determined by analyzing actuating waveforms of an electromagnetic actuator of active vibration insulators on a plurality of the control frequencies by means of a waveform analysis;

generating higher harmonic component signals of the actuating waveforms based on the control frequency, which based on the cyclically pulsating signals, and the higher harmonic component datum information;

storing the higher harmonic component datum information;

removing the higher harmonic component signals from the input signals, and outputting the resulting processed input signals; and receiving the processed input signals, and generating output signals for actuating the electromagnetic actuator based on the processed input signals;

thereby inhibiting the vibration generating source from vibrating by means of vibrating forces exerted by the electromagnetic actuator actuated in accordance with the output signals.

The vibration control method according to the second aspect of the present invention operates and effects advantages in the same manner as the above-described vibration controller according to the second aspect of the present invention.

In the vibration controller and vibration control method according to the first aspect of the present invention as well as in the vibration controller and vibration control method according to the second aspect of the present invention, the actuating waveforms can preferably comprise vibration waveforms resulting from actuating the electromagnetic actuator. In this instance, the vibration waveforms resulting from actuating the electromagnetic actuator can be acceleration signal waveforms, which are detectable with acceleration sensors disposed at a predetermined position in engine frames, for instance.

When carrying out vibration controls using adaptive control methods, for example, acceleration sensors have been employed already. If such is the case, it is possible to detect the actuating waveforms of the electromagnetic actuator without employing another acceleration sensor anew. Moreover, not only acceleration sensors are extremely less expensive, but also can be installed with ease.

Moreover, the actuating waveforms can preferably result from the vibrating forces exerted by the electromagnetic actuator. In this instance, it is possible to detect the vibrating forces exerted by the electromagnetic actuator with load sensors. In addition, the actuating waveforms can preferably result from the output signals. The output signals can be actuating currents supplied to the electromagnetic actuator, for example. In this instance, it is possible to detect the actuating currents with current sensors.

When the actuating waveforms result from the vibrating forces exerted by the electromagnetic actuator or the actuating currents supplied to the electromagnetic actuator, it is possible to detect distortions resulting from cross-over distortions or the time constant of the electromagnetic actuator with good accuracy, because the vibrating forces or actuating currents are less likely to be affected by disturbance.

In the vibration controller and vibration control method according to the first aspect of the present invention as well as in the vibration controller and vibration control method according to the second aspect of the present invention, the higher harmonic component datum information can preferably comprise an amplitude and phase of higher harmonic components of the actuating waveforms. In this instance, the higher harmonic component signal generator of the vibration controllers according to the first and second aspect of the present invention can generate the higher harmonic component signals based on the higher harmonic component datum information, comprising the amplitude and phase, and a sine wave table, stored in advance. When thus using a sine wave table, it is possible to generate the higher harmonic component signals readily and less expensively. Note that it is possible to employ sine wave tables used for generating input signals as the sine wave table for generating the higher harmonic component signals.

In addition, the higher harmonic component signal generator of the vibration controllers according to the first and second aspect of the present invention can preferably generate the higher harmonic component signals based on the higher harmonic component datum information and the control frequency. That is, the control frequency used in generating the higher harmonic component signals becomes identical with the control frequency which the input signal generator uses to generate the input signals. In other words, the higher harmonic component signal generator can securely generate the higher harmonic component signals of the input signals which the input signal generator generates.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLE NO. 1

Figure 1:
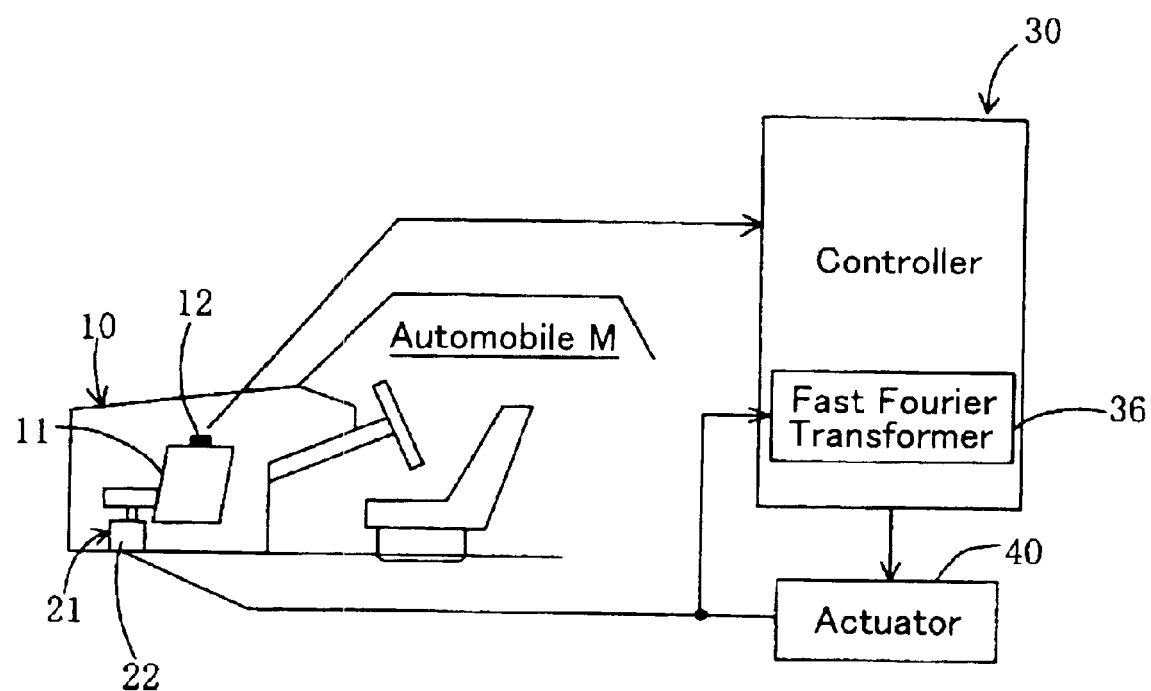
FIG. 1 is a schematic diagram for roughly illustrating a part of a vehicle to which a vibration controller for active vibration insulators according to Example No. 1 of the present invention is applied.
Figure 2:
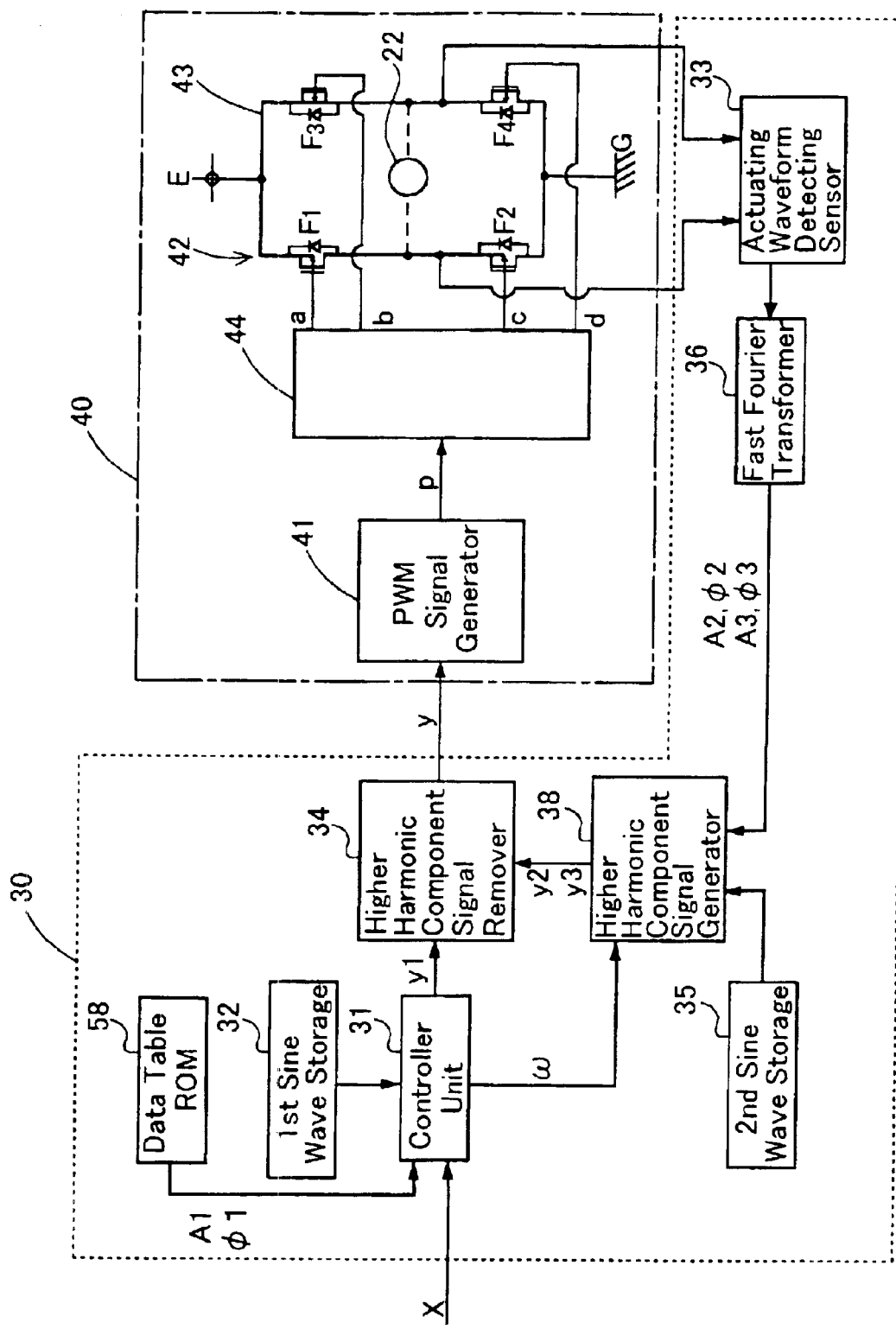
FIG. 2 is a block diagram for roughly illustrating a control circuit structure of the vibration controller for active vibration insulators according to Example No. 1 of the present invention.

The present invention will be hereinafter described in detail with reference to specific examples of the present invention using accompanied drawings. FIG. 1 roughly illustrates a vibration controller for an automobile M equipped with a 4-cycle gasoline engine. Example No. 1 of the present invention is applied to the vibration controller. FIG. 2 illustrates a block diagram of an electric circuit for controlling vibrations emitted from the 4-cycle gasoline engine.

As illustrated in FIG. 1, the automobile M comprises an automobile body 10 which is equipped with an engine mount 21 provided with an actuator, an active vibration insulator, (hereinafter simply referred to as an "engine mount"). The engine mount 21 supports an engine 11. The engine mount 21 comprises a cylinder-shaped housing (not shown), a vibration insulator rubber (not shown) disposed in the cylinder-shaped housing, and a solenoid type electromagnetic actuator 22 disposed in the cylinder-shaped housing. The solenoid type electromagnetic actuator 22 controls the dynamic displacements of the engine 11 by the displacements of the vibration insulator rubber. Note that the electromagnetic actuator 22 is not limited to solenoid type electromagnetic actuators but can be simple actuators using electromagnets. The engine mount 21 is fastened to the automobile body 10 at the lower fastening shaft (not shown), and is installed to the engine 11 at the upper fastening shaft (not shown), thereby supporting the engine 11. A rotary pulse sensor 12 is disposed adjacent to the crankshaft of the engine 11. The rotary pulse sensor 12 outputs rotary pulsating signals x of the crankshaft. A later-described controller unit 31 determines a control objective frequency ω, a basic frequency of primary cyclic signals y1 (i.e., input signals), based on the rotary pulsating signals x.

As illustrated in FIG. 1, the vibration controller for electrically controlling the vibration control mechanism comprises the controller 30, and an actuator 40. As illustrated in FIG. 2, the controller 30 comprises a data table ROM 58, a first sine wave storage 32, a controller unit 31, an actuating waveform detecting sensor 33, a fast Fourier transformer 36, a second sine wave storage 35, a higher harmonic component signal generator 38, and a higher harmonic component signal remover 34.

The data table ROM 58 stores updated data on filter coefficients for adaptive vibration control. Note that the filter coefficient comprises an amplitude A1 and a phase Φ1. The first sine wave storage 32 stores a sine wave table based on the filter coefficients. The controller unit 31 comprises a microcomputer, receives the rotary pulsating signals x from the rotary pulse sensor 12, and determines the control objective frequency ω. Moreover, the controller unit 31 further receives the filter coefficients from the data table ROM 58, and furthermore receives the sine wave table from the first sine wave storage 32. In addition, the controller unit 31 refers to the control objective frequency ω, filter coefficients and sine wave table, and calculates a primary cyclic signal y1 in accordance with equation (1) below.

$$y1 = A1 \times \sin(\omega \times t + \Phi 1) \tag{1}$$

The waveform detecting sensor 33 (i.e., the present actuating waveform detector) detects actuating waveforms of the electromagnetic actuator 22. In Example No. 1, the waveform detecting sensor 33 detects actuating currents I, output signals output from the actuator 40 to the electromagnetic actuator 22. That is, the actuating waveforms detected by the actuating waveform detecting sensor 33 are waveforms of the actuating currents I supplied to the electromagnetic actuator 22.

The fast Fourier transformer 36 (i.e., the present waveform analyzing means) calculates higher harmonic component datum information of the actuating currents I, the output signals detected by the actuating waveform detecting sensor 33. That is, the fast Fourier transformer 36 analyzes the actuating currents I by a waveform analysis by means of a fast Fourier transformation to calculate the higher harmonic component datum information. In Example No. 1, the higher harmonic component datum information calculated by the fast Fourier transformer 36 comprises an amplitude A2 and a phase Φ2 of a secondary higher harmonic component and an amplitude A3 and a phase Φ3 of a tertiary higher harmonic component, secondary and tertiary higher harmonic components which are included in the actuating currents I.

The second sine wave storage 35 stores a sine wave table based on the higher harmonic component datum information. The higher harmonic component signal generator 38 receives the control objective frequency ω from the controller unit 31, further receives the higher harmonic component datum information A2, Φ2, A3, Φ3, and furthermore receives the sine wave table from the second sine wave storage 35. In addition, the higher harmonic component signal generator 38 refers to the control objective frequency ω, the higher harmonic component datum information A2, Φ2, A3, Φ3, and the sine wave table, and calculates a secondary cyclic signal y2 and a tertiary cyclic signal y3 in accordance with equations (2) and (3) below, respectively.

$$y2 = A2 \times \sin(\omega \times t + \Phi 2) \tag{2}$$

$$y3 = A3 \times \sin(\omega \times t + \Phi 3) \tag{3}$$

The higher harmonic component signal remover 34 receives the primary cyclic signal y1 calculated by the controller unit 31, and further receives the secondary and tertiary cyclic signals y2, y3 calculated by the higher harmonic component signal generator 38. Moreover, the higher harmonic component signal remover 34 calculates a cyclic signal y based on the primary cyclic signal y1, secondary cyclic signal y2 and tertiary cyclic signal y3 in accordance with equation (4) below. That is, the cyclic signal y is a signal which is processed by removing the secondary cyclic signal y2 and tertiary cyclic signal y3 from the primary cyclic signal y1.

$$y = y1 - (y2 + y3) \tag{4}$$

The actuator 40 is connected with the controller 30 at the input end, and is connected with the electromagnetic actuator 22 of the engine mount 21 at the output end. The actuator 40 comprises a pulse-width modulated signal generator 41, and an actuator circuit 42. Note that the actuator circuit 42 comprises a so-called H-bridge circuit.

The pulse-width modulated signal generator 41 receives the cyclic signal y output from the higher harmonic component signal remover 34 of the controller 30. Moreover, the pulse-width modulated signal generator 41 generates a pulse-width modulated signal p (hereinafter referred to as a "PWM signal p") based on the input cyclic signal y. Note that the cyclic signal y is modulated into the pulse-width modulated signal p by a pulse-width modulation in which an amplitude of sine waves is turned into a pulse width.

The actuator circuit 42 comprises an H-bridge circuit 43. The H-bridge circuit 43 comprises four field effect transistors (hereinafter referred to as "FETs") F1, F2, F3, F4 whose source terminals and drain terminals are disposed symmetrically in a bridging manner. The H-bridge circuit 43 is connected with a direct current source E at one of the paired symmetric ends, and is connected with the electromagnetic actuator 22 of the engine mount 21 at the other one of the paired symmetric ends. That is, the actuating currents I, the cyclic output signals output from the H-bridge circuit 43, are supplied to the electromagnetic actuator 22. Note that the above-described actuating waveform detecting sensor 33 of the controller 30 detects the actuating currents I.

Moreover, in front of the H-bridge circuit 43, there is disposed a pre-driver 44. The pre-driver 44 selects the positive or negative polarity of the PWM signal p, and outputs signals to the gate terminal of the respective FETs F1 through F4 of the H bridge circuit 43, depending on the selected polarity. The four output terminals a, b, c, d of the pre-driver 44 are connected with the FETs F1 through F4 in the following manner: the output terminals a, d are connected with the FETs F1, F4, respectively; and the output terminals b, c are connected with the FETs F3, F2, respectively. In addition, when the PWM signal p input from the pulse-width modulated signal generator 41 exhibits one of the polarities, the pre-driver 44 outputs signals to the H-bridge circuit 43 through the output terminals a, d. On the other hand, when the PWM signal p input from the pulse-width modulated signal generator 41 exhibits the other one of the polarities, the pre-driver 44 outputs signals to the H-bridge circuit 43 through the output terminals b, c.

The operations of the above-described vibration controller according to Example No. 1 of the present invention will be hereinafter described. In order to simplify the descriptions on the operations, the vibration controller starts controlling the electromagnetic actuator 22 of the engine mount 21 when the rotary pulsating signals x are free from the higher harmonic components.

The rotary pulse sensor 12 (shown in FIG. 1) detects crankshaft rotary pulses emitted from the vibration generating source 51 (shown in FIG. 1), and outputs the rotary pulsating signals x to the controller unit 31 of the controller 30. The controller unit 31 receives the rotary pulsating signals x, and judges whether the input rotary pulsating signals x are the control objective frequency $\omega$. If so, the controller unit 31 generates a control objective signal for the control objective frequency $\omega$. Moreover, the controller unit 31 compensates the control objective signal for an amplitude and a phase in accordance with the filter coefficients stored in the data table ROM 58. In addition, the controller unit 31 retrieves a sine wave signal, which corresponds to the control objective signal, from sine wave table stored in the first sine wave storage 32, and generates the primary cyclic signal y1, an input signal.

Note that the rotary pulsating signals x are herein free from the higher harmonic components. Accordingly, the higher harmonic component signal remover 34 regards the primary cyclic signal y1 as the cyclic signal y, and outputs it to the actuator 40 as it is.

The pulse-width modulated signal generator 41 of the actuator 40 subjects the cyclic signal y, which is output from the higher component signal remover 34, to a pulse-width modulation. Accordingly, the pulse-width modulated signal generator 41 generates the PWM signal p to which crossover distortions resulting from the pulse-width modulation is added. When the PWM signal p is input into the actuator circuit 42, the pre-driver 44 outputs signals to the H-bridge circuit 43 depending on the polarity of the PWM signal p. For example, when the PWM signal p is positive, the pre-driver 44 outputs a signal through the output terminals a, d shown in FIG. 2 to turn on FETs F1, F4 of the H-bridge circuit 43 depending on the output signal. Thus, the H-bridge circuit 43 supplies the actuating current I to the actuator 22 depending on the magnitude of the output signal. The actuating current I flows in the actuator 22 in the direction from the left side to the right side of the drawing, and thereby actuates the actuator 22. On the contrarily, when the PWM signal p is negative, the pre-driver 44 outputs a signal through the output terminals b, c shown in FIG. 2 to turn on FETs F3, F2 of the H-bridge circuit 43 depending on the output signal. Thus, the H-bridge circuit 43 supplies the actuating current I to the actuator 22 depending on the magnitude of the output signal. The actuating current I flows in the actuator 22 in the direction from the right side to the left side of the drawing 2, and thereby actuates the actuator 22. In these instances, the distortions resulting from the time constant of the electromagnetic actuator 22 are added to the actuating current I.

Thus, the actuating current I supplied to the electromagnetic actuator 22 is distorted by the influence of the crossover distortions resulting from the pulse-width modulated signal generator 41 and the influence of the distortions resulting from the time constant of the electromagnetic actuator 22.

Moreover, the actuating waveform detecting sensor 33 detects the actuating current I supplied from the H-bridge circuit 43 of the actuator 40 to the electromagnetic actuator 22. Then, the actuating waveform detecting sensor 33 outputs the detected actuating current I to the fast Fourier transformer 36. The fast Fourier transformer 36 carries out a waveform analysis on the actuating current I by a fast Fourier transformation to calculate the higher harmonic component datum information. That is, the fast Fourier transformer 36 calculates the amplitude A2 and phase $\Phi 2$ of the secondary higher harmonic component and the amplitude A3 and phase $\Phi 3$ of the tertiary higher harmonic component, secondary and tertiary harmonic components which are included in the actuating currents I.

In addition, the fast Fourier transformer 36 outputs the calculated amplitudes A2, A3 and phases $\Phi 2$, $\Phi 3$ of the secondary and tertiary higher harmonic components to the higher harmonic component signal generator 38. Then, the higher harmonic component signal generator 38 calculates the secondary cyclic signal y2 and the tertiary cyclic signal 73 based on the higher harmonic component datum information A2, $\Phi 2$, A3, $\Phi 3$ and the sine wave table retrieved from the second sine wave storage 35.

The higher harmonic component signal generator 38 then outputs the calculated secondary and tertiary cyclic signals y2, y3 of the higher harmonic components to the higher harmonic component signal remover 34. The higher harmonic component signal remover 34 removes the secondary and tertiary cyclic signals y2, y3 from the primary cyclic signal y1 which the controller unit 31 generates, and outputs the resulting processed cyclic signal y to the actuator 40. Thus, the actuator 40 actuates the electromagnetic actuator 22 based on the processed cyclic signal y from which the secondary and tertiary cyclic signals y2, y3 have been removed.

Specifically, the processed cyclic signal y, which the higher harmonic component signal remover 34 of the controller 30 outputs, is a signal in which distortions are incorporated into the primary cyclic signal y1 by the magnitudes of the secondary and tertiary cyclic signals y2, y3. In other words, the distortions resulting from the pulse-width modulated signal generator 41 and the distortions resulting from the time constant of the electromagnetic actuator 22 are added to the primary cyclic signal y1.

When the distortions resulting from the pulse-width modulated signal generator 41 and the distortions resulting from the time constant of the electromagnetic actuator 22 are thus added to the primary cyclic signal y1, the distortions cancel the higher harmonic components included in the primary cyclic signal y1 to result in the processed cyclic signal y. Accordingly, the actuating current I is adapted to being substantially free from distortions. Consequently, the electromagnetic actuator 22 produces an appropriate vibrating force, because it is actuated by the actuating current I from which distortions are removed. Therefore, the engine 11, a vibration generating source, is inhibited from vibrating effectively.

As described above, the vibration controller for active vibration insulators according to Example No. 1 of the present invention determines the higher harmonic component datum information of the actuating currents I, the output signals, by a waveform analysis. Moreover, the vibration controller removes the higher harmonic components from the primary cyclic signal y1 to output the processed cyclic signal y. Accordingly, the vibration controller can securely remove the cross-over distortions, included in non-processed cyclic signals y (i.e., the input signals) at the actuator 40, and the distortions, resulting from the final electromagnetic actuator 22, from the actuating currents I. Consequently, the electromagnetic actuator 22 can produce appropriate vibrating forces, because the vibration controller actuates the electromagnetic actuator 22 with the actuating currents I from which the distortions are removed. Moreover, the vibration controller can reduce the cost for the vibration control, because it determines the higher harmonic component datum information by a simple waveform analysis method and uses the resulting higher harmonic component datum information to remove the higher harmonic components from non-processed cyclic signals y, the input signals.

Figure 3:
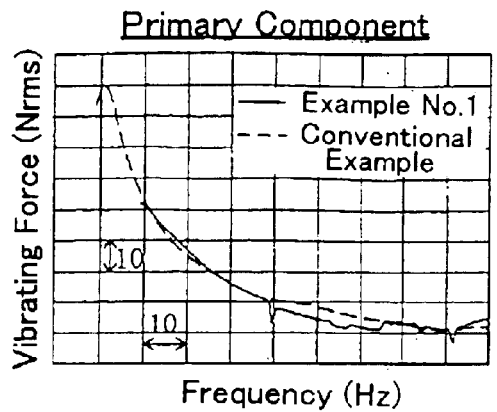
FIG. 3 is a line chart for illustrating the frequency characteristic of the primary component of vibrating forces exerted by an electromagnetic actuator which was controlled by the vibration controller for active vibration insulators according to Example No. 1 of the present invention, and the same of vibrating forces exerted by the electromagnetic actuator which was controlled by a vibration controller for active vibration insulators according to a conventional example.
Figure 4:
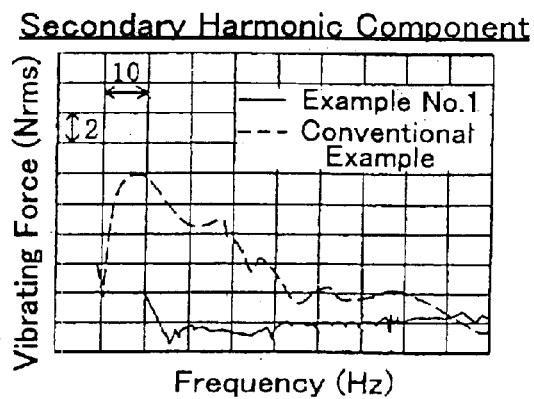
FIG. 4 is a line chart for illustrating the frequency characteristic of the secondary harmonic component of vibrating forces exerted by an electromagnetic actuator which was controlled by the vibration controller for active vibration insulators according to Example No. 1 of the present invention, and the same of vibrating forces exerted by the electromagnetic actuator which was controlled by a vibration controller for active vibration insulators according to a conventional example.
Figure 5:
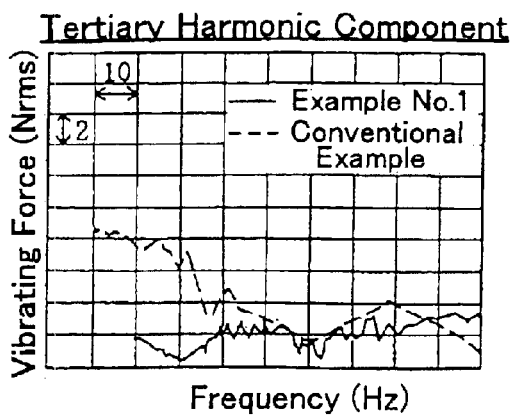
FIG. 5 is a line chart for illustrating the frequency characteristic of the tertiary harmonic component of vibrating forces exerted by an electromagnetic actuator which was controlled by the vibration controller for active vibration insulators according to Example No. 1 of the present invention, and the same of vibrating forces exerted by the electromagnetic actuator which was controlled by a vibration controller for active vibration insulators according to a conventional example.
Figure 9:
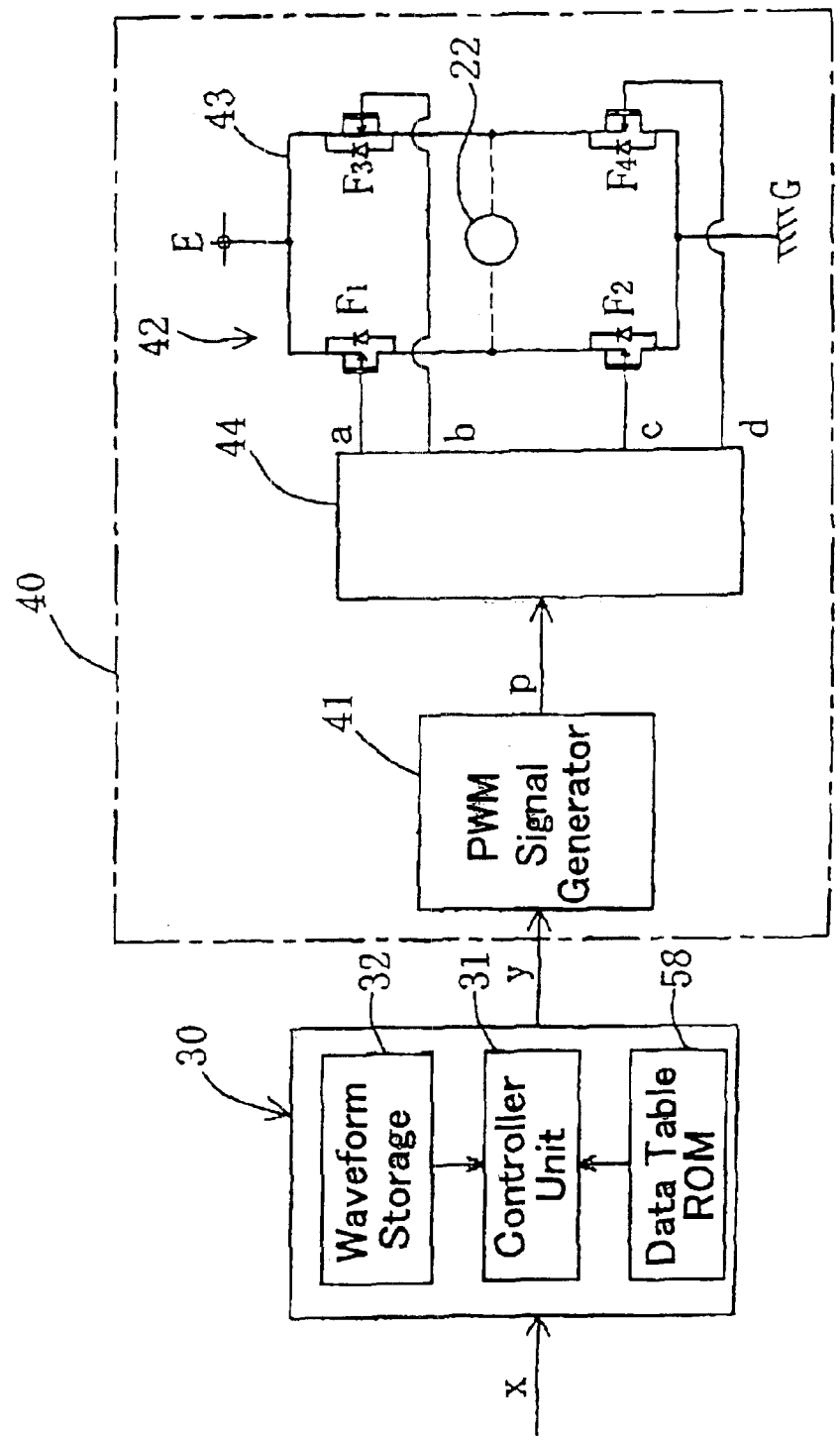
FIG. 9 is a block diagram for roughly illustrating a control circuit structure of a vibration controller for active vibration insulators, which uses optimum filter coefficients as a data table, according to a conventional example.

Next, specific vibration control results produced by the vibration controller according to Example No. 1 of the present invention will be hereinafter described while comparing them with the same produced by a conventional example. Note that the conventional example was the conventional vibration controller illustrated in FIG. 9, and that the waveform table stored in the waveform storage 32 did not include distortions. FIGS. 3, 4 and 5 illustrate the specific vibration control results produced by the vibration controllers according to Example No. 1 and the conventional example. That is, FIGS. 3, 4 and 5 illustrate how the cyclic signals y whose frequencies fell in a low-frequency range of from 20 to 50 Hz and which were processed by the vibration controllers according to Example No. 1 and the conventional example resulted in the vibrating forces (root-mean-squared N) of the electromagnetic actuator 22 for the primary component (or fundamental vibration component), the secondary harmonic component and the tertiary harmonic component, respectively. The cyclic signals y processed by the vibration controllers according to Example No. 1 and the conventional example resulted in the vibrating forces of the electromagnetic actuator 22, which were not different from each other substantially, for the primary component. On the other hand, it is apparent that the cyclic signals y processed by the vibration controller according to Example No. 1 resulted in the vibrating forces of the electromagnetic actuator 22, which were lowered remarkably by 8 root-mean-squared N with respect to the same resulting from the cyclic signals y processed by the vibration controller according to the conventional example, for the secondary harmonic component, one of the higher order harmonic components.

Moreover, it is also apparent that the cyclic signals y processed by the vibration controller according to Example No. 1 resulted in the vibrating forces of the electromagnetic actuator 22, which were lowered by about 6 root-mean-squared N maximally with respect to the same resulting from the cyclic signals y processed by the vibration controller according to the conventional example, for the tertiary harmonic component. Thus, it is evident that the vibration controller according to Example No. 1 effected the reduction of higher order harmonic components more than the vibration controller according to the conventional example did.

EXAMPLE NO. 2

Figure 6:
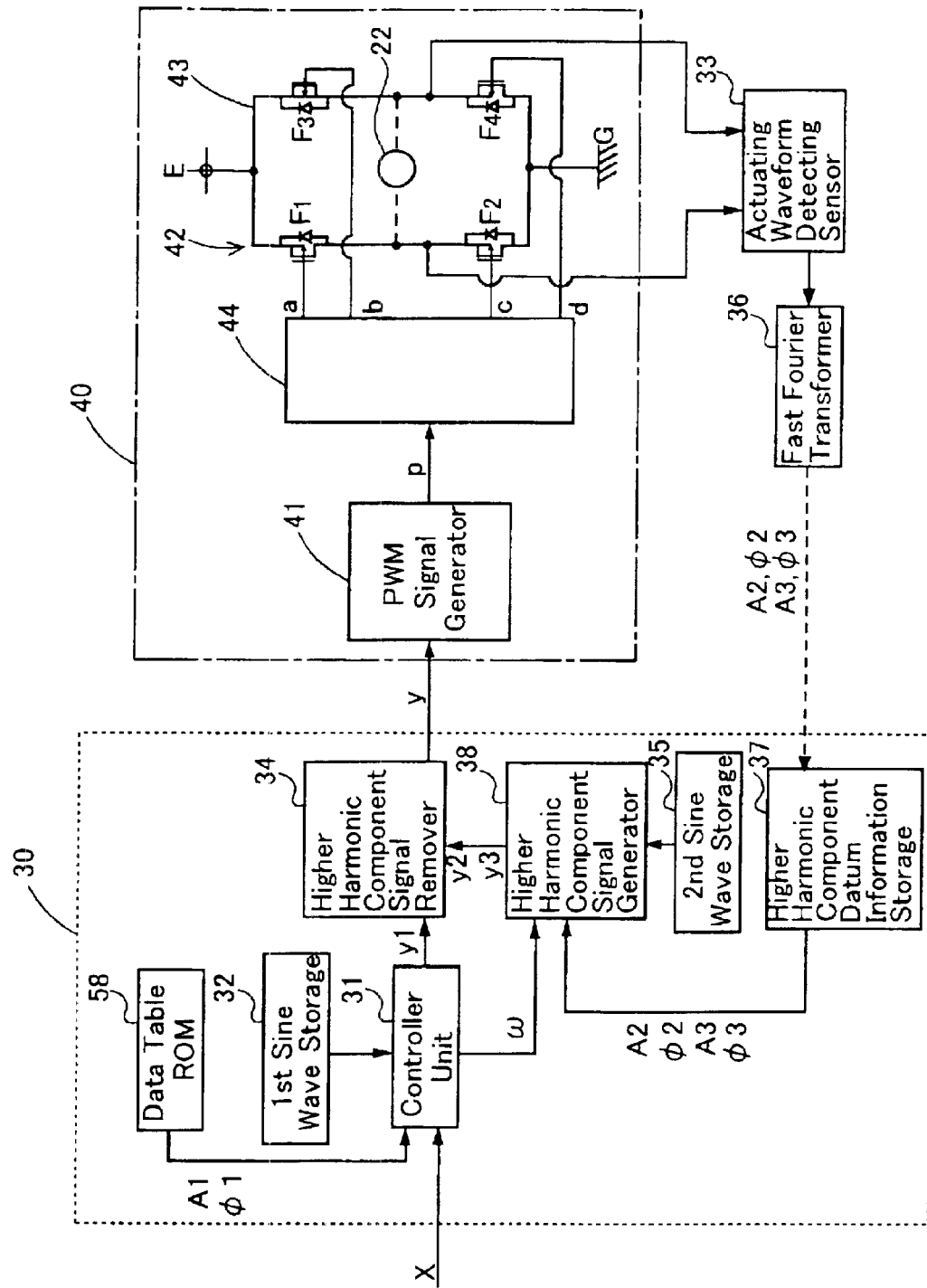
FIG. 6 is a block diagram for roughly illustrating a control circuit structure of a vibration controller for active vibration insulators according to Example No. 2 of the present invention.
Figure 7:
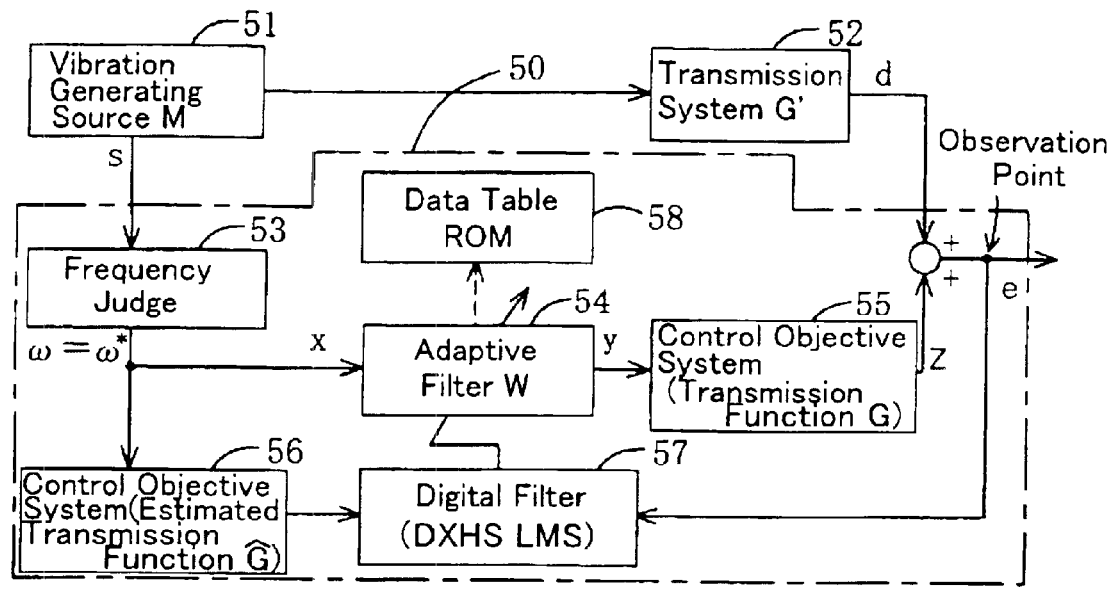
FIG. 7 is a block diagram for roughly illustrating a conventional adaptive vibration controller using a DXHS LMS filter.
Figure 8:
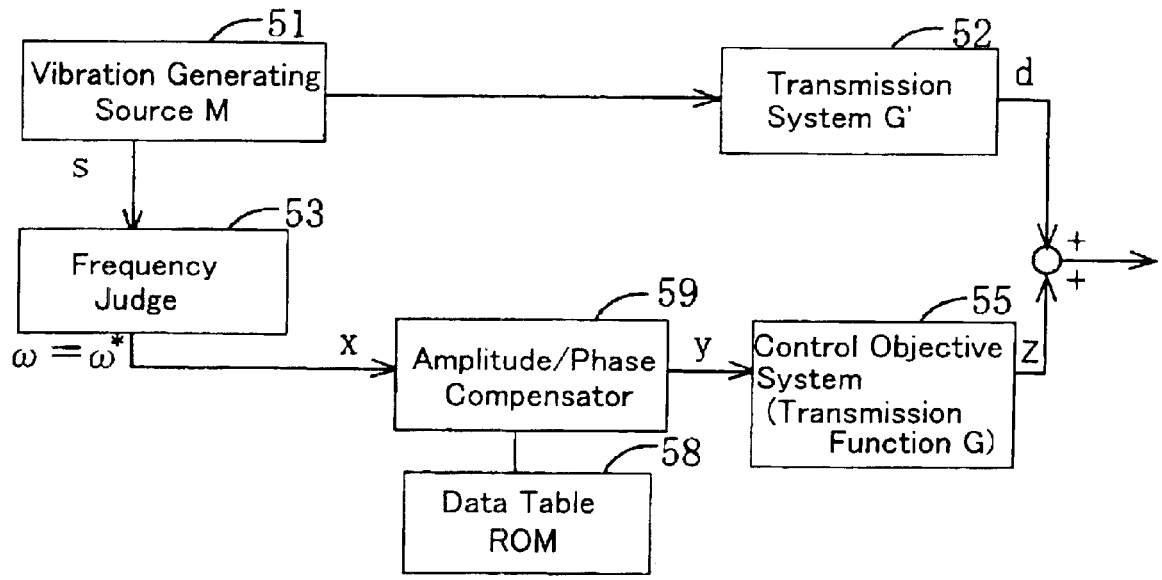
FIG. 8 is a block diagram for roughly illustrating a conventional vibration controller for active vibration insulators which stores optimum filter coefficients, produced by the conventional adaptive vibration controller, as a data table to use.

A vibration controller for active vibration insulators according to Example No. 2 of the present invention will be hereinafter described. As illustrated in FIG. 6, the vibration controller according to Example No. 2 uses a higher harmonic component datum information storage 37, instead of incorporating the fast Fourier transformer 36 into the controller 30 directly as described in Example No. 1. The higher harmonic component datum information storage 37 comprises a CD-ROM, for example, which stores the higher harmonic component datum information determined in advance by analyzing the waveforms of the actuating currents I on a plurality of the control objective frequencies ω with the fast Fourier transformer 36. The higher harmonic component datum information storage 37 is connected with the higher harmonic component generator 38 of the controller 30.

The actuating waveform detecting sensor 33 and fast Fourier transformer 36, described in Example No. 1, are used to calculate the higher harmonic component datum information of the actuating current I on a plurality of the control objective frequencies ω. That is, the actuating waveform detecting sensor 33 detects the actuating current I of the electromagnetic actuator 22. The fast Fourier transformer calculates the higher harmonic component datum information by analyzing the waveforms of the detected actuating current I. Moreover, a plurality of the control objective frequencies ω are subjected to these processes. The higher harmonic component datum information storage 37 stores the thus determined higher harmonic component datum information on a plurality of the control objective frequencies ω in advance. Note that the higher harmonic component datum information comprises the amplitude A2 and phase Φ2 of the secondary higher harmonic component and the amplitude A3 and phase Φ3 of the tertiary higher harmonic component, secondary and tertiary harmonic components which are included in the actuating current I.

Moreover, in the vibration controller according to Example No. 2 of the present invention, the higher harmonic component signal generator 38 of the controller 30 retrieves the higher harmonic component datum information from the higher harmonic component datum information storage 37 in accordance with the control objective frequency ω of the primary cyclic signals y1, the input signals. At the same time, the higher harmonic component signal generator 38 retrieves the sine wave table from the second sine wave storage 35 to output the secondary cyclic signal y2 and the tertiary cyclic signal y3.

In addition, the higher harmonic signal remover 34 generates the higher-component-removed cyclic signal y which is calculated by removing the secondary cyclic signal y2 and the tertiary cyclic signal y3 from the primary cyclic signal y1. Thus, the higher-component-removed cyclic signal y includes distortions. Specifically, higher harmonic components included in the cyclic signal y are canceled by the cross-over distortions resulting from the pulse-width modulated signal generator 41 and the distortions resulting from the time constant of the electromagnetic actuator 22, because the distortions are added to the cyclic signal y as described above. As a result, the cyclic signal y is free from the higher harmonic components.

The vibration controller according to Example No. 2 of the present invention also adapts the actuating current I to being substantially free from distortions in the same manner as above-described in Example No. 1, and can actuate the electromagnetic actuator 22 by such actuating currents I. As a result, the electromagnetic actuator 22 produces appropriate vibrating forces to inhibit the engine 11, a vibration generating source, from vibrating effectively. Moreover, the vibration controller much more reduces the labor for preparing data tables, and furthermore holds down the cost for the vibration control, compared with conventional vibration controllers, because the higher harmonic component datum information storage 37 stores the higher harmonic component datum information, which has been calculated by a waveform analysis in advance, and the higher harmonic component signal generator 38 simply retrieves the stored higher harmonic component datum information.

The vibration controllers according to Example Nos. 1 and 2 of the present invention use the cyclic signals as the input signals. However, it is possible as well to use sine wave signals or pulsating signals as the input signals. Moreover, the vibration controllers use the rotary pulsating signals emitted from the engine 11 as the input signals. In addition to the rotary pulsating signals, when vehicle state detection signals, such as signals relating to turning on and off air-conditioners, shift positions and coolant temperatures, are made into optimum filters for the respective states and the resultant optimum filters are tabulated, it is possible to control active vibration insulators more stably. Moreover, the vibration controllers uses the DXHS LMS filter as an adaptive filter. However, it is possible to use other adaptive filters, such as Filtered-X LMS filter, instead of the DXHS LMS filter. In addition, the present invention is applicable to the vibration control not only for vehicles or automobiles, but also for the other vibration generating sources, such as industrial machines, machining tools, computer hardware and household electric appliances.

Moreover, in the vibration controllers according to Example Nos. 1 and 2 of the present invention, the actuating waveform detecting sensor 33 detects the actuating currents I supplied form the actuator 40 to the electromagnetic actuator 22. However, the actuating waveform detecting sensor 33 is not limited to those which detect the actuating currents I. For example, the actuating waveform detecting sensor 33 can be acceleration sensors which detect vibration waveforms resulting from actuating the electromagnetic actuator 22. Moreover, the actuating waveform detecting sensor 33 can be load sensors which detect the vibrating forces produced by the electromagnetic actuator 22.

Note that the present invention is described with reference to the vibration controller according to Example Nos. 1 and 2 which cancel the secondary and tertiary higher harmonic components only. It is apparent, however, that the present invention is likewise applicable to vibration controllers for removing the quaternary higher harmonic component or higher.

INDUSTRIAL APPLICABILITY

The vibration controller or vibration control method according to the present invention determines the higher harmonic components of output signals by a waveform analysis, and removes the higher harmonic components from input signals. Accordingly, it is possible to control the cross-over distortions resulting from pulse-width modulations and the distortions resulting from the time constant of electromagnetic actuators readily and reliably. Consequently, electromagnetic actuators can produce appropriate vibrating forces by output signals with suppressed distortions. Thus, the present vibration controller or vibration control method is very useful in controlling vibrations, because the present vibration controller or vibration control method can control the vibrations of active vibration insulators optimally and less expensively.

Having now fully described the present invention, it will be apparent to one of ordinary skill in the art that many changes and modifications can be made thereto without departing from the spirit or scope of the present invention as set forth herein including the appended claims.

What is claimed is:

1. A vibration controller for active vibration insulators, the vibration controller comprising:
   an input signal generator for generating input signals comprising a control frequency and phase, the control frequency and phase based on cyclically pulsating signals emitted from a vibration generating source;
   an actuating waveform detector for detecting actuating waveforms of an electromagnetic actuator of active vibration insulators;
   waveform analyzing means for determining higher harmonic component datum information on the actuating waveforms by carrying out a waveform analysis on the actuating waveforms;
   a higher harmonic component signal generator for generating higher harmonic component signals of the actuating waveforms based on the higher harmonic component datum information;
   a higher harmonic component signal remover for removing the higher harmonic component signals from the input signals and outputting the resulting processed input signals; and
   an actuator for receiving the processed input signals, generating output signals based on the processed input signals and actuating the electromagnetic actuator in accordance with the output signals;
   whereby inhibiting the vibration generating source from vibrating by means of vibrating forces exerted by the electromagnetic actuator.

2. A vibration controller for active vibration insulators, the vibration controller comprising:

an input signal generator for generating input signals comprising a control frequency and phase, the control frequency and phase based on cyclically pulsating signals emitted from a vibration generating source;

higher harmonic component datum information storing means for storing higher harmonic component datum information on actuating waveforms, the actuating waveforms determined in advance by analyzing actuating waveforms of an electromagnetic actuator of active vibration insulators on a plurality of the control frequencies with waveform analyzing means;

a higher harmonic component signal generator for generating higher harmonic component signals of the actuating waveforms based on the control frequency, which is based on the cyclically pulsating signals, and higher harmonic component datum information, which is stored in the higher harmonic component datum information storing means;

a higher harmonic component signal remover for removing the higher harmonic component signals from the input signals and outputting the resulting processed signals; and an actuator for receiving the processed input signals, generating output signals based on the processed input signals and actuating the electromagnetic actuator in accordance with the output signals;

whereby inhibiting the vibration generating source from vibrating by means of vibrating forces exerted by the electromagnetic actuator.

3. The vibration controller set forth in claim 1 or 2, wherein the actuating waveforms comprise vibration waveforms resulting from actuating the electromagnetic actuator.

4. The vibration controller set forth in claim 1 or 2, wherein the actuating waveforms result from the vibrating forces exerted by the electromagnetic actuator.

5. The vibration controller set forth in claim 1 or 2, wherein the actuating waveforms result from the output signals.

6. The vibration controller set forth in claim 1 or 2, wherein the higher harmonic component datum information comprises an amplitude and phase of higher harmonic components of the actuating waveforms.

7. The vibration controller set forth in claim 6, wherein the higher harmonic component signal generator generates the higher harmonic component signals based on the higher harmonic component datum information and a sine wave table stored in advance.

8. The vibration controller set forth in claim 1, wherein the higher harmonic component signal generator generates the higher harmonic component signals based on the higher harmonic component datum information and the control frequency.

9. A method for controlling vibrations of active vibration insulators, the process comprising the steps of:

generating input signals comprising a control frequency and phase, the control frequency and phase based on cyclically pulsating signals emitted from a vibration generating source;

detecting actuating waveforms of an electromagnetic actuator of active vibration insulators;

determining higher harmonic component datum information on the actuating waveforms by carrying out a waveform analysis on the actuating waveforms;

generating higher harmonic component signals of the actuating waveforms based on the higher harmonic component datum information;

removing the higher harmonic component signals from the input signals, and outputting the resulting processed input signals; and receiving the processed input signals, and generating output signals for actuating the electromagnetic actuator based on the processed input signals;

thereby inhibiting the vibration generating source from vibrating by means of vibrating forces exerted by the electromagnetic actuator actuated in accordance with the output signals.

10. A method for controlling vibrations of active vibration insulators, the process comprising the steps of:

generating input signals comprising a control frequency and phase, the control frequency and phase based on cyclically pulsating signals emitted from a vibration generating source;

preparing higher harmonic component datum information on actuating waveforms in advance, the actuating waveforms determined by analyzing actuating waveforms of an electromagnetic actuator of active vibration insulators on a plurality of the control frequencies by means of a waveform analysis;

generating higher harmonic component signals of the actuating waveforms based on the control frequency, which based on the cyclically pulsating signals, and the higher harmonic component datum information;

storing the higher harmonic component datum information;

removing the higher harmonic component signals from the input signals, and outputting the resulting processed input signals; and receiving the processed input signals, and generating output signals for actuating the electromagnetic actuator based on the processed input signals;

thereby inhibiting the vibration generating source from vibrating by means of vibrating forces exerted by the electromagnetic actuator actuated in accordance with the output signals.

* * * * *